(12) United States Patent
Utaki et al.

(10) Patent No.: US 8,974,575 B2
(45) Date of Patent: Mar. 10, 2015

(54) METHOD OF ENRICHING COMBUSTIBLE GAS

(75) Inventors: Takahisa Utaki, Kyotanabe (JP); Tamotsu Kotani, Kizugawa (JP)

(73) Assignee: Osaka Gas Co., Ltd., Osaka (JP)

( * ) Notice: Subject to any disclaimer, the term of this patent is extended or adjusted under 35 U.S.C. 154(b) by 206 days.

(21) Appl. No.: 13/636,395

(22) PCT Filed: Mar. 10, 2011

(86) PCT No.: PCT/JP2011/055655
§ 371 (c)(1),
(2), (4) Date: Nov. 9, 2012

(87) PCT Pub. No.: WO2011/118406
PCT Pub. Date: Sep. 29, 2011

(65) Prior Publication Data
US 2013/0125466 A1    May 23, 2013

(30) Foreign Application Priority Data

Mar. 24, 2010 (JP) .................................. 2010-068744

(51) Int. Cl.
*B01D 53/047* (2006.01)
*C10L 3/10* (2006.01)
*B01D 53/053* (2006.01)

(52) U.S. Cl.
CPC ....... *C10L 3/101* (2013.01); *B01D 2259/40037* (2013.01); *B01D 53/047* (2013.01); *B01D 53/053* (2013.01); *B01D 2256/24* (2013.01); *B01D 2259/40007* (2013.01); *B01D 2259/402* (2013.01)

USPC .................... 95/96; 95/103; 95/143; 585/820

(58) Field of Classification Search
CPC ............... B01D 53/047; B01D 53/053; B01D 2256/24; B01D 2256/245; B01D 2256/402; B01D 2257/104; B01D 2259/40015; B01D 2259/40037; B01D 2259/40007; C10L 3/101
USPC ........................ 95/96, 100, 103, 143; 96/121; 585/820–821
See application file for complete search history.

(56) References Cited

U.S. PATENT DOCUMENTS

| 4,077,780 A | * | 3/1978 | Doshi ............................ 95/100 |
| 4,816,039 A | * | 3/1989 | Krishnamurthy et al. ........ 95/97 |
| 4,857,083 A | * | 8/1989 | DiMartino ........................ 95/26 |
| 4,948,391 A | | 8/1990 | Noguchi |
| 5,174,796 A | * | 12/1992 | Davis et al. ..................... 95/100 |

(Continued)

FOREIGN PATENT DOCUMENTS

| CN | 1646207 A | 7/2005 |
| JP | 1288313 A | 11/1989 |

(Continued)

*Primary Examiner* — Frank Lawrence
(74) *Attorney, Agent, or Firm* — The Webb Law Firm (57) ABSTRACT

Disclosed is a method for enriching combustible gas, which suppresses the deterioration and pulverization of an adsorbent without extending a period for pressure equalization. The pressure equalization is effected by opening a pressure equalization passage opening/closing valve incorporated in a pressure equalization passage, after completion of adsorption in a first adsorption tower and after completion of desorption in a second adsorption tower connected to the first adsorption tower via the pressure equalization passage.

2 Claims, 4 Drawing Sheets

(56) References Cited

U.S. PATENT DOCUMENTS

| | | | |
|---|---|---|---|
| 5,234,472 A * | 8/1993 | Krishnamurthy et al. | 95/98 |
| 5,704,964 A | 1/1998 | Kaneko et al. | |
| 6,113,672 A * | 9/2000 | Kapoor et al. | 95/101 |
| 6,527,831 B2 * | 3/2003 | Baksh et al. | 95/100 |
| 7,300,497 B2 | 11/2007 | Urakami et al. | |
| 7,491,260 B2 * | 2/2009 | Herb et al. | 95/96 |
| 8,262,771 B2 | 9/2012 | Seki et al. | |
| 2002/0014153 A1 | 2/2002 | Baksh et al. | |

FOREIGN PATENT DOCUMENTS

| | | |
|---|---|---|
| JP | 8173746 A | 7/1996 |
| JP | 2001187309 A | 7/2001 |
| JP | 2009220004 A | 10/2009 |
| PL | 163229 B1 | 4/1992 |
| PL | 318330 A1 | 8/1998 |
| PL | 211551 B3 | 12/2005 |
| WO | 2008053680 A1 | 5/2008 |

* cited by examiner

Fig.1

METHOD OF ENRICHING COMBUSTIBLE GAS

BACKGROUND OF THE INVENTION

1. Field of the Invention

The present invention relates to a method of enriching a combustible gas providing a gas introduction section to which a source gas is fed, a gas discharge section for discharging an off gas, a gas collection section for collecting a product gas, a plurality of adsorption towers each charged therein with an adsorbent for selectively adsorbing the combustible gas, a pressure equalization passage interconnecting the adsorption towers with each other, and a pressure equalization passage opening/closing valve incorporated within the pressure equalization passage; the method comprising:

(1) an adsorption step for feeding the source gas to the adsorption towers from the gas introduction section for causing the combustible gas contained in the source gas to be adsorbed to the adsorbent and causing un-adsorbed gas un-adsorbed to the adsorbent to be discharged from the gas discharge section;

(2) a desorption step for causing the combustible gas adsorbed to the adsorbent to be desorbed from the adsorbent and extracting the desorbed combustible gas to the outside via the gas collection section;

the above steps (1), (2) being effected in alternation; and (3) a pressure equalization step effected between a pair of adsorption towers interconnected via the pressure equalization passage after the adsorption step in one adsorption tower and after the desorption step in the other adsorption tower, with setting open the pressure equalization passage opening/closing valve in the pressure equalization passage.

2. Description of Related Art

In general, a combustible gas has possibility of explosion. It is said that when a combustible gas is contained within a predetermined concentration range in e.g. a source gas, there exists possibility of its explosion. The concentration range having the explosion possibility differs, depending on the kind of the combustible gas. In general, however, it is believed that the explosive range is where the combustible gas is contained by from 5 to 20 Vol. % approximately. And, it is also believed that in the case of methane gas too, there exists possibility of its explosion in a similar concentration range.

Further, it is believed that the possibility of explosion of combustible gas relates not only to the concentration of the combustible gas, but also to presence of an oxygen gas in a predetermined concentration range. This concentration range is said to be where the oxygen gas is contained by 10 Vol. % or more.

Therefore, in handling a gas containing a combustible gas, sufficient caution must be taken about the above-described concentration ranges of the combustible gas and oxygen gas. In particular, in the case of a gas containing a combustible gas or an oxygen gas near the explosive concentration range, it is important to keep out of the above-described concentration range through adjustment of the concentration range of the combustible gas or oxygen gas.

Here, a methane gas after enrichment has a relatively high concentration (about 60 Vol. % methane concentration) which is outside the explosive concentration range. On the other hand, in the case of an offgas obtained by extracting a certain amount of methane from a coal mine gas (having a methane gas concentration of 44 Vol. % approximately and an oxygen gas concentration of 12 Vol. % approximately), this off gas contains a relatively low concentration of methane gas (methane gas concentration of 44 Vol. % or less). Further, the above off gas contains also a predetermined concentration (oxygen gas concentration of approximately 12 Vol. % or more). Thus, with this offgas, both the concentration of the methane gas and the concentration of oxygen gas may fall within the respective explosive ranges thereof. This therefore is problematic for the possibility of explosion of offgas.

Incidentally, in case enrichment is carried out with suitably using an adsorption tower accommodating therein an adsorbent for selectively adsorbing combustible gas, normally, in the adsorption step, a source gas is introduced to the gas introduction section and the rest of the gas after the adsorption is discharged through the gas discharge section which is provided on the opposite side away from the gas introduction section. The management of adsorption in this adsorption step is effected, with taking into account the concentration of the combustible gas in the off gas to be discharged to the outside, in connection with the relation with the explosion limit described above. For instance, in connection with the relationship with the amount of adsorbent held inside the adsorption tower, there will be obtained in advance an adsorption period which constrains the concentration of combustible gas discharged as off gas below the explosion limit. Then, as the adsorption is effected with reference to this adsorption period as the upper limit, a favorable operation condition will be maintained. Here, the inside of the adsorption tower after the adsorption step is under a pressurized state with the source gas fed thereto. Further, as the adsorbent adsorbs mainly the combustible gas, in the remaining space inside the adsorption tower, gases (mainly air) other than the combustible gas as impurities will be present.

Further, the combustible gas which was adsorbed in the adsorption tower will be taken out in the desorption step through the gas collection passage. However, gas that is desorbed from the adsorbent at an early stage in the desorption step contains other gases than the combustible gas, as impurities. Therefore, in order to obtain a combustible gas with high purity, this gas cannot be collected directly as a product gas. Rather, it is preferred that this gas be further purified for extracting the combustible gas therefrom. With this, the purity of the product gas can be enhanced and at the same time the collection ratio of combustible gas can be enhanced as well.

Meanwhile, considering now pressure variation inside each adsorption tower, the inside of an adsorption tower which has undergone an adsorption step is under a high-pressure condition. On the other hand, the inside of an adsorption tower which has undergone a desorption step is under an extremely depressurized condition due to completion of discharge of the combustible gas therefrom. Also, when another adsorption step is to be effected after completion of a desorption step, the pressure will be progressively increased from the above-described highly depressurized condition, thereby to prepare a condition that allows adsorption of the combustible gas, thus shifting to the operation for adsorbing combustible gas in the source gas.

Then, if a pressure equalization passage interconnecting adsorption towers is provided and a pressure equalization passage opening/closing valve is incorporated within this pressure equalization passage, when an adsorption tower which has completed the adsorption step (this adsorption tower will be referred to as "the first adsorption tower" hereinafter) is about to initiate a desorption step, the gas desorbed from the adsorbent (this gas will be referred to as "the early desorption gas" hereinafter) can be supplied to another adsorption tower which is about to initiate an adsorption step (this adsorption tower will be referred to as "the second adsorption tower" hereinafter). With this, the combustible gas contained in the early desorption gas can be supplied to the second adsorption tower to be used in the subsequent adsorption step to be effected therein. Therefore, in the first adsorption tower, the concentration of the combustible gas that is collected in the subsequent desorption step can be increased, whereas, in the second adsorption tower, the combustible gas can be collected from the early desorption gas with pressure increase required for shifting to the adsorption step (so-called pressure equalization step). (see Patent Document 1).

PRIOR ART DOCUMENT

Patent Document

Patent Document 1: Japanese Unexamined Patent Application Publication No. 2009-220004

SUMMARY OF THE INVENTION

Incidentally, in effecting the pressure equalization step above, the early desorption gas supplied from the first adsorption tower to the second adsorption tower flows from the maximally pressurized first adsorption tower into the maximally depressurized second adsorption tower. For this reason, at the early stage of the pressure equalization step, the pressurized early desorption gas will flow into the second adsorption tower instantaneously at a high velocity. Such pressure equalization step, as a process involved in purification/enrichment of combustible gas, does not make any contribution to the collection of product gas, i.e. a process which reduces its productivity. Therefore, it is required that the pressure equalization step be effected to achieve the maximum possible effect within a short period. For this reason, in the pressure equalization step, the early desorption gas tends to be conveyed within a relatively short period. This results in further increase in the velocity of the early desorption gas supplied from the first adsorption tower to the second adsorption tower.

Thus, as this flow of the early desorption gas enters the second adsorption tower, the flow causes fluidization of the adsorbent therein, which leads in turn to deterioration/pulverization of the adsorbent.

As a measure to prevent the above, it is conceivable to provide "resistance" such as narrowing of the pressure equalization passage, in order to limit the velocity of the early desorption gas passing through the pressure equalization passage. This, however, is considered disadvantageous since such reduction in the gas flow velocity in the pressure equalization passage leads to corresponding increase in the period required for pressure equalization, which results in turn in disadvantageous reduction in the productivity of product gas.

In view of the above-described situation, the object of the present invention is to avoid increase in the period required for pressure equalization in the enrichment process of combustible gas, thereby to restrict occurrence of deterioration/pulverization of the adsorbent.

[Configuration 1]

According to a characterizing feature of the present invention for achieving the above-noted object, there is provided a method of enriching a combustible gas providing a gas introduction section to which a source gas is fed, a gas discharge section for discharging an off gas, a gas collection section for collecting a product gas, a plurality of adsorption towers each charged therein with an adsorbent for selectively adsorbing the combustible gas, a pressure equalization passage interconnecting the adsorption towers with each other, and a pressure equalization passage opening/closing valve incorporated within the pressure equalization passage; the method comprising:

(1) an adsorption step for feeding the source gas to the adsorption towers from the gas introduction section for causing the combustible gas contained in the source gas to be adsorbed to the adsorbent and causing un-adsorbed gas un-adsorbed to the adsorbent to be discharged from the gas discharge section;

(2) a desorption step for causing the combustible gas adsorbed to the adsorbent to be desorbed from the adsorbent and extracting the desorbed combustible gas to the outside via the gas collection section;

the above steps (1), (2) being effected in alternation; and (3) a pressure equalization step effected between a pair of adsorption towers interconnected via the pressure equalization passage after the adsorption step in one adsorption tower (referred to as "the first adsorption tower" hereinafter) and after the desorption step in the other adsorption tower (referred to as "the second adsorption tower" hereinafter), with setting open the pressure equalization passage opening/closing valve in the pressure equalization passage;

wherein the method further comprises a preliminary pressure equalization step that is effected at the time of start of the pressure equalization step in the second adsorption tower for supplying a gas (referred to as "buffer gas" hereinafter) into the second adsorption tower from a position different from the connection position of the pressure equalization passage to the second adsorption tower.

Preferably, a passage other than the pressure equalization passage is provided at a position in opposition to the connection position of the pressure equalization passage to the second adsorption tower.

[Function/Effect 1]

That is, with the above-described configuration, a pressure equalization step is effected between a pair of adsorption towers interconnected via the pressure equalization passage after the adsorption step in the first adsorption tower and after the desorption step in the second adsorption tower, with setting open the pressure equalization passage opening/closing valve in the pressure equalization passage (that is, in timed association with the pressure equalization step in the first adsorption tower, a preliminary pressure equalization step is effected in the second adsorption tower at an early stage of the pressure equalization step in this second adsorption tower). Consequently, the combustible gas enrichment can be effected in a highly efficient manner.

Further, in the second adsorption tower, if rapid introduction thereto of the early desorption gas at the time of start of the pressure equalization step is restricted as described above, the early desorption gas which is to enter this second adsorption tower subsequently will flow into this second adsorption tower under a relatively rectified manner. Therefore, this will less likely lead to fluidization of the adsorbent and there is no need to keep supplying the buffer gas for the entire course of the pressure equalization step. Moreover, with the present invention, with execution of the preliminary pressure equalization step, the introduction of buffer gas is effected only at the time of start of the pressure equalization step. Therefore, the charging amount of buffer gas into the second adsorption tower can be small and this charging will not impair or hinder the subsequent adsorption step.

In the above, with execution of the preliminary pressure equalization step for supplying the gas to the second adsorption tower from a position in opposition to the position of connection of the pressure equalization passage to the second pressure equalization passage, this supplied gas will flow into the second adsorption tower along the direction opposite to the direction of the gas (referred to as the "early desorption gas" hereinafter) that enters the second adsorption tower in the pressure equalization step.

That is, in the pressure equalization step, when the early desorption gas from the first adsorption tower is to enter the second adsorption tower, this gas is to enter the second adsorption tower along the direction in opposition to the buffer gas. With this, the flow of the early desorption gas and the flow of the buffer gas will cancel out each other, so that the velocity of the early desorption gas flowing into the second adsorption tower is reduced. This alleviates the above-described situation of the early desorption gas colliding the adsorbent at high velocity, thus generating turbulent flow and causing fluidization of the adsorbent leading to eventual deterioration/pulverization thereof.

Therefore, with the elimination of the factor leading to deterioration/pulverization of adsorbent, it has become possible to contribute to prolongation of the service life of the adsorbent and stable operation of the combustible gas enrichment system.

[Configuration 2]

Preferably, the pressure equalization passage is connected to a lower portion of the adsorption tower and the gas discharge section is provided in an upper portion of the adsorption tower, and there is provided a gas supply section for supplying the gas (buffer gas) through the gas discharge section into the adsorption tower.

[Function/Effect 2]

That is, if the pressure equalization passage and the gas supply section are provided at positions in opposition to each other, the respective flows are canceled out each other, thus alleviating the phenomenon of fluidization and subsequent deterioration and pulverization of adsorbent. In addition to this, if the pressure equalization passage and the gas supply passage are provided in distribution on the upper and lower sides of the adsorption tower, this arrangement serves to restrict occurrence of direct collision between the early desorption gas and the buffer gas, which occurrence leads in turn to generation of turbulent flow inside the adsorption tower. Consequently, the factor leading to fluidization of the adsorbent can be eliminated even more effectively.

BRIEF DESCRIPTION OF THE DRAWINGS

FIGS. 2A-D is a configuration diagram showing respective steps (a) to (d) of a method of enriching combustible gas, FIGS. 3E-H is a configuration diagram showing respective steps (e) to (h) of the method of enriching combustible gas.

DETAILED DESCRIPTION OF THE INVENTION

Next, a combustible gas enrichment system (referred to briefly as a "PSA system" hereinafter) for use in the inventive method of enriching combustible gas will be explained. In the following, some preferred embodiments will be disclosed. It is understood however that the these respective embodiments are disclosed only for the purpose of illustrating the present invention, and various changes can be made therein as long as such changes do not depart from the essence of the present invention and the present invention is not limited to the following description.

Figure 1:
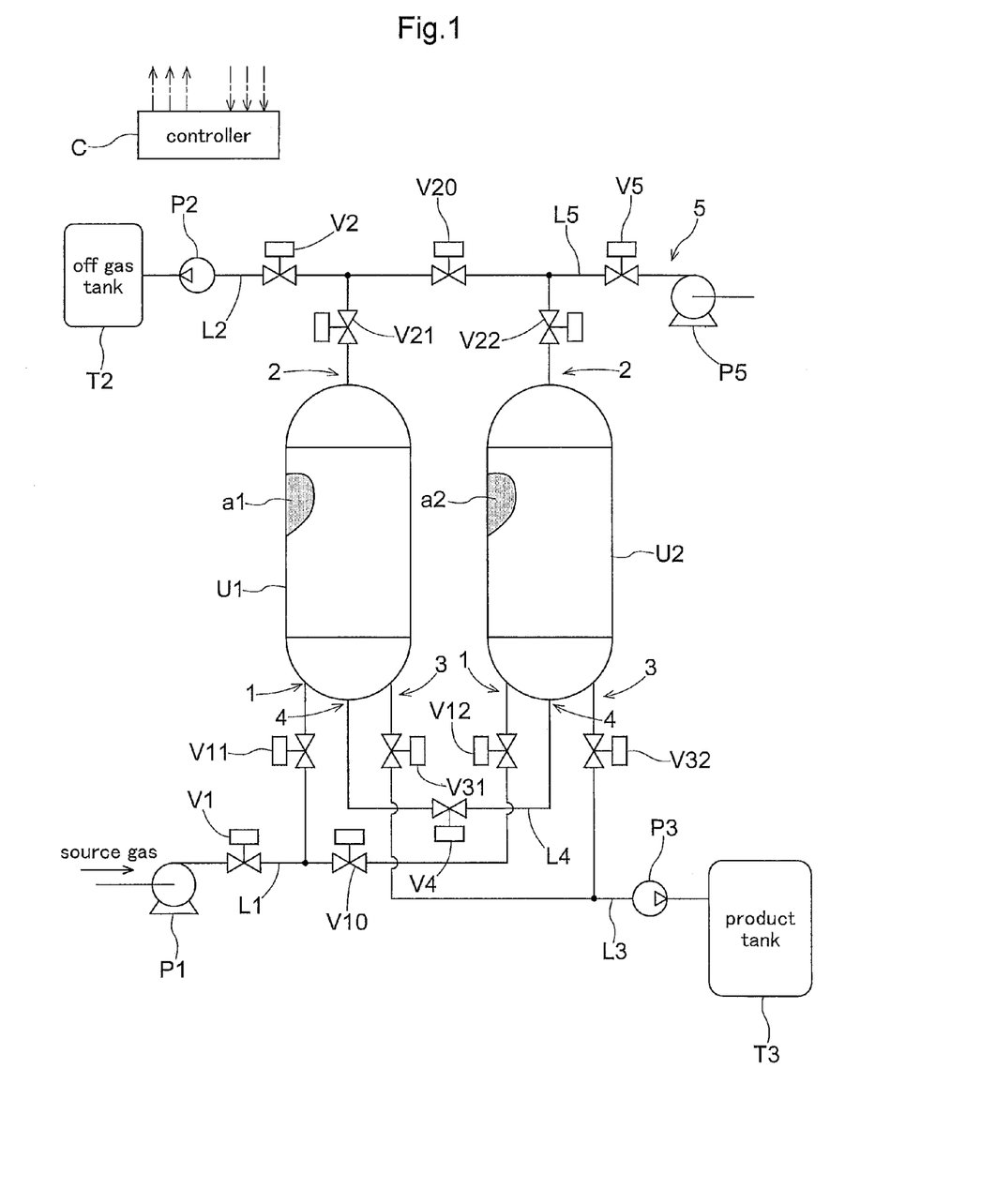
FIG. 1 is a schematic showing a combustible gas enrichment system.

The PSA system relating to the present invention, as shown in FIG. 1, includes first and second adsorption towers U1, U2 charged with adsorbent a1, a2, respectively therein. The system includes also a controller C for controlling opening/closing valves V1-V5, etc. incorporated within gas passages L1-L5 connected to the respective adsorption towers U1, U2. Each adsorption tower U1, U2 includes, as gas passages, a source gas supply passage L1 for supplying an amount of source gas to the respective adsorption tower U1, U2 and includes also an off gas discharge passage L2 for discharging remaining gas (off gas) after completion of adsorption of combustible gas by adsorbent a1, a2 with supplying of the gas through the source gas supply passage L1. Further, a product gas collection passage L3 is provided for colleting an amount of product gas as an enriched gas collected from the first and second adsorption towers U1, U2 in a product tank T3. Further, between the first and second adsorption towers U1, U2, there is provided a pressure equalization passage L4 for effecting a pressure equalization step to be described later. The above-described off gas discharge passage L2 is combined and connected with an air supply passage L5 for supplying an amount of air as "buffer gas" to the first and second adsorption towers U1, U2.

With activation of a vacuum pump P3 mounted in the gas collection passage L3, the combustible gas as the product gas adsorbed by the adsorbents a1, a2 can be collected from the first and second adsorption towers U1, U2 into the product tank T3 under a pressurized condition (positive pressure inside the product tank T3). And, when being supplied from this product tank T3 via the air supply passage L5 to the first and second adsorption towers U1, U2, the supplied product gas has an increased combustible gas concentration.

<Source Gas>

The source gas employed in the present invention is a gas containing a combustible gas and air. Instead of this, the source gas can be a coal mine gas containing methane gas and air. Further, the combustible gas is not particularly limited as long as it is a gas having combustible property, but this can be a methane gas contained in a coal mine gas. Incidentally, the term "coal mine gas" refers to a gas generated from a coal mine. Though will differ depending on conditions, a coal mine gas contains methane gas by 20 to 40 Vol. % approximately and air (containing mainly nitrogen gas and oxygen gas) by 60 to 80 Vol. % approximately.

As the source gas, a coal mine gas collected from a coal mine can be conveyed under its current pressure condition into the respective adsorption tower U1, U2.

<Adsorption Towers>

The first and second adsorption towers U1, U2 are charged with the adsorbents a1, a2 inside the respective cylindrical vessels thereof. The first and second adsorption towers U1, U2 each includes a gas introduction section 1, a gas discharge section 2, a gas collection section 3, a pressure equalization section 4 and the gas passages L1-L5, etc. for introducing/discharging gas thereto/therefrom are connected to the towers.

More particularly, to the gas introduction section 1, the source gas supply passage L1 is connected. To the gas discharge section 2, the off gas discharge passage L2 and the air supply passage L5 are connected. To the gas collection section 3, the product gas collection passage L3 is connected. And, to the pressure equalization section 4, the pressure equalization passage L4 is connected.

Further, the source gas supply passage L1 incorporates or mounts therein a source gas supply pump P1 and opening/closing valves V1, V10, V11, V12. The off gas discharge passage L2 incorporates or mounts therein opening/closing valves V2, V20, V21, V22 and a pressure charging pump P2 for storing an amount of off gas in an off gas tank T2. The product gas collection passage L3 incorporates or mounts therein opening/closing valves V31, V32 and the vacuum pump P3. Further, the pressure equalization passage L4 incorporates therein a pressure equalization passage opening/closing valve L4. And, the air supply passage L5 incorporates or mounts therein an opening/closing valve V5 and a buffer gas supply pump P5.

<Adsorbent>

The adsorbents a1, a2 are not particularly limited as long as they are capable of selectively adsorbing the combustible gas. However, as the adsorbent a1, a2, it is advantageous to employ a methane gas adsorbent a1, a2 which is at least one selected from the group consisting of activated carbon, zeolite, silica gel, metallo-organic complex (copper fumarate, copper terephthalate, copper cyclohexanedicarboxylate, etc.) having an average pore diameter ranging from 0.45 to 1.5 nm as determined by the MP method and a methane adsorption amount of 20 Nml/g or higher at the atmospheric pressure and 298K. Incidentally, the average pore diameter ranges preferably from 0.45 to 1.5 nm, more preferably, from 0.5 to 0.95 nm. Further, the methane adsorption amount is preferably 25 Nml/g or higher. For instance, such activated carbon as above can be prepared as follows. An amount of coconut husk or coconut husk charcoal is carbonized completely at 600° C. in nitrogen gas, thereby to obtain an amount of carbide. This is then pulverized into particles having diameters ranging from 1 to 3 mm. The resultant material is used as a carbonaceous material. Then, with using a batch type flow activation reactor, the carbonaceous material is activated at 860° C. in an atmosphere containing water vapor from 10 to 15 Vol. %, carbon dioxide from 15 to 20 Vol. % and the rest of nitrogen With the above-described use of the methane gas adsorbent a1, a2 capable of selectively adsorbing methane gas at the atmospheric pressure and 298K, it is possible for this methane gas adsorbent a1, a2 to adsorb methane gas sufficiently even at the atmospheric pressure and 298K.

Namely, if the methane adsorption amount at the atmospheric pressure and 298K is smaller than 20 Nml/g, the methane gas adsorption performance at lower pressures (in particular, a near-atmospheric pressure) will deteriorate, so that the methane gas concentration in the methane gas after enrichment will be lower and also in order to maintain the adsorption capacity, it will become necessary to increase the amount of the methane gas adsorbent a1, 2a, which leads to enlargement of the system. Incidentally, although the upper limit of the above-described methane gas adsorption amount is not particularly limited, the methane gas adsorption amount of the currently available methane gas adsorbent a1, a2 is about 40 Nm/g or less.

Further, if the average pore diameter as determined by the MP method is smaller than 0.45 nm, this leads to increase in the adsorption amounts of the oxygen gas and nitrogen gas. As a result, there will occur reduction in the methane gas concentration in the methane gas after enrichment or reduction in the adsorption rate as the average pore diameter approaching the molecule diameter of methane gas, so that deterioration in the methane gas adsorption capacity or even total inability of adsorption may result. On the other hand, if the average pore diameter as determined by the MP method is greater than 1.5 nm, this leads to reduction in the methane gas adsorption capacity at lower pressures (in particular, a near-atmospheric pressure), so that the methane gas concentration in the methane gas after enrichment will be lower and also in order to maintain the adsorption capacity, it will become necessary to increase the amount of the methane gas adsorbent a1, a2, which leads to enlargement of the system.

Therefore, it is preferred to employ a methane gas adsorbent a1, a2 which is at least one selected from the group consisting of activated carbon, zeolite, silica gel, metallo-organic complex having an average pore diameter ranging from 0.45 to 1.5 nm as determined by the MP method and a methane adsorption amount of 20 Nml/g or higher at the atmospheric pressure and 298K.

Moreover, preferably, the methane gas adsorbent a1, a2 has a pore volume with the HK determined average pore diameter of 1.0 nm or less by 50% or more, more preferably by 70% or more, still more preferably by 80% or more. In this case, as the adsorbent having the average pore diameter of 1.0 nm or less capable of selectively adsorbing methane gas occupies 50% or more of the total pore volume, it is possible to increase the methane gas adsorption amount at a subatmospheric pressure (about 0.1 Mpa), so that methane gas can be adsorbed sufficiently even at such subatmospheric pressure. Incidentally, in practice, the pore volume of the average pore diameter greater than 0.4 nm which is the determination limit and less than 1.0 nm should be 50% or more of the total pore volume. Further, more preferably, the methane gas adsorbent a1, a2 should have the pore volume for the average pore diameter greater than 0.45 nm and less than 1.0 nm by 50% or more, On the other hand, the methane gas adsorbent a1, a2 should have such a nitrogen adsorption amount at 77K that its nitrogen adsorption amount at the relative pressure of 0.013 corresponding to the HK determined average pore diameter of 1.0 nm ranges 50% or more, preferably 70% or more, more preferably 80% or more. In this case, the adsorption amount at the relative pressure of 0.99 represents the total pore volume and the adsorption amount at the relative pressure of 0.013 represents the pore volume of 1.0 nm or less. The ratio of each value above indicates the ratio of the pores of 1.0 nm or less being high, like the above-described case. As a result, in the case of using mixture gas of methane gas and air as the source gas also, enrichment of methane gas at a near-atmospheric pressure can be carried out easily and efficiently.

<Combustible Gas Enrichment Method>

Next, a combustible gas enrichment method to be implemented in the respective adsorption tower U1, U2 will be described with reference to FIGS. 2-3. Incidentally, in the following, the first adsorption tower U1 will be explained as an example of the adsorption towers U1, U2. And, the discussion will proceed with the assumption of the gas passages L1-L5, the opening/closing valves V1-V5 being used and similar operations being effected also in the second adsorption tower U2. Meanwhile, in the drawings, open valves V1-V5 and gas flow passages L1-L5 under the gas flowing conditions are shown in black and with bold lines; whereas, closed valves or valves not related to the particular step V1-V5 and gas passages L1-L5 under the gas flowing conditions are shown in white and thin lines.

<Adsorption Step>

Figure 2A:
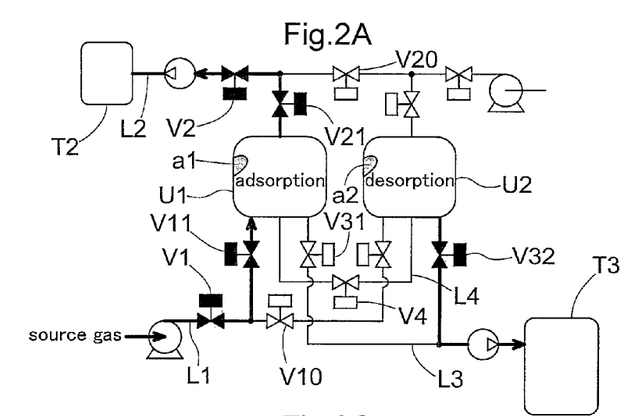
Figure 2B:
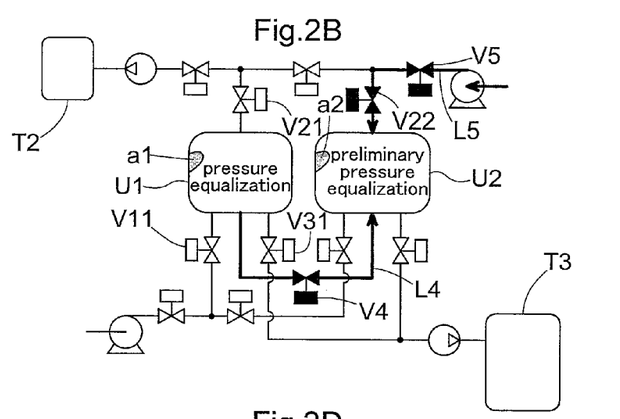
Figure 2C:
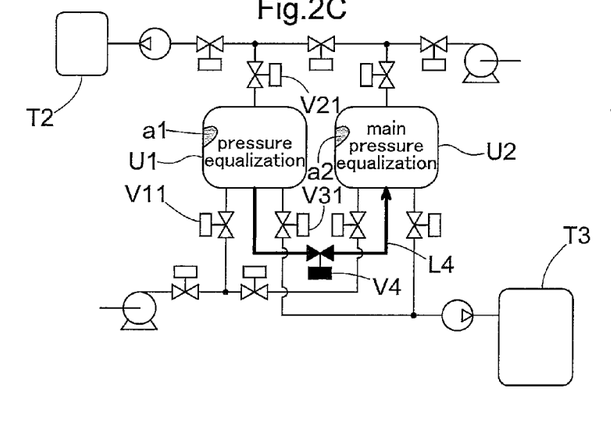
Figure 2D:
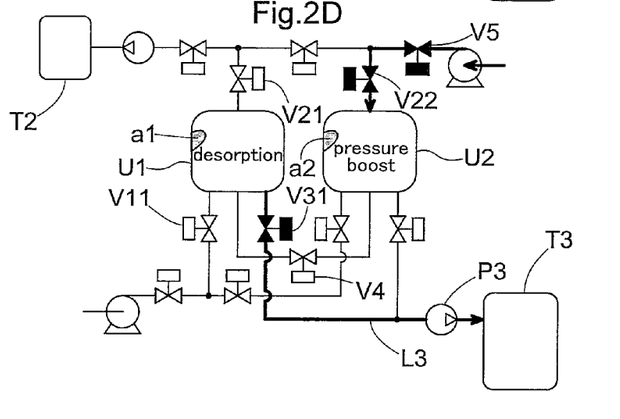

In this adsorption step, as shown in FIG. 2(a), an amount of source gas is introduced into the first adsorption tower U1 so that the combustible gas therein is adsorbed to the adsorbent a1 and also the remaining gas is discharged to the outside. In the course of this, the opening/closing valves V1, V11 in the source gas supply passage L1 and the opening/closing valves V2, V21 in the off gas discharge passage L2 are set open whereas the opening/closing valve V10 in the source gas supply passage L1, the opening/closing valve V20 in the off gas supply passage L2, the opening/closing valve V31 in the product gas collection passage L3 and the pressure equalization opening/closing valve V4 in the pressure equalization passage L4 are closed.

With the above, inside the first adsorption tower U1, the combustible gas can be adsorbed to the adsorbent a1 and the remaining impurity gas as an off gas can be discharged to the outside. This adsorption step is effected for 120 seconds.

Incidentally, in the course of the above, a desorption step is being effected in the second adsorption tower U2.

<Pressure Equalization Step>

Inside the first adsorption tower U1 currently engaged in an adsorption process, the combustible gas is adsorbed to the adsorbent a1 and the impurity gas with increased concentration is present in the remaining space therein. If a desorption step is effected under this condition, the impurity gas will be mixed into the product gas and also the impurity gas which has been adsorbed to the adsorbent a1 inadvertently will tend to be desorbed therefrom with priority over the product gas. Therefore, the impurity gas contained in the gas which is desorbed from the adsorbent a1 at an early stage in the desorption step will be mixed in the product gas inadvertently.

Therefore, in this pressure equalization step, as shown in FIG. 2(b), (c), communication is established between the first and second adsorption towers U1, U2, so as to allow communication of gases between these adsorption towers U1, U2 and to effect a pressure equalization therebetween. Namely, the pressure equalization step is made possible by opening the pressure equalization passage V4 in the pressure equalization passage L4 is opened and closing all the other valves V11, V21 and V31.

With the above, inside the first adsorption tower U1, almost entire amount of the impurity gas adsorbed to the adsorbent a1 will be desorbed and will be discharged together with the amount of impurity gas present in the remaining space as an early desorption gas to the second adsorption tower U2. Further, the inside pressure of the first adsorption tower U1 will be reduced to some extent to be suitable for a desorption step. This pressure equalization step is effected for 20 seconds.

Incidentally, in the course of the above, in the second adsorption tower U2, a preliminary pressure equalization step and a main pressure equalization step will be effected as the pressure equalization step. Referring more particularly to the pressure equalization step in the second adsorption tower U2, as shown in FIG. 2(b), prior to the main pressure equalization step, there is effected the preliminary pressure equalization step for effecting pressure equalization while mixing an amount of air as a buffer gas from the gas discharge passage L2. Thereafter, the introduction of the buffer gas is stopped and the main pressure equalization step is effected (see FIG. 2(c)).

<Desorption Step>

Figure 3E:
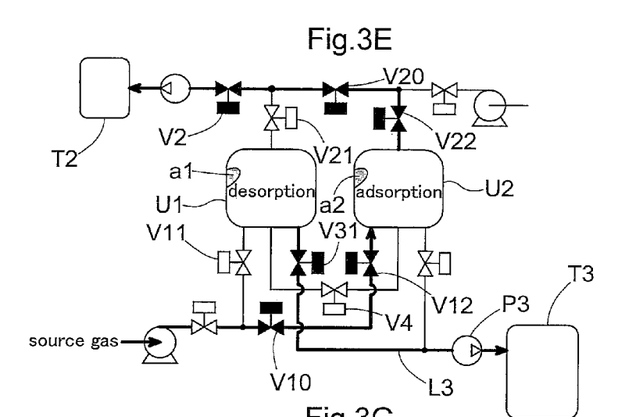
Figure 3F:
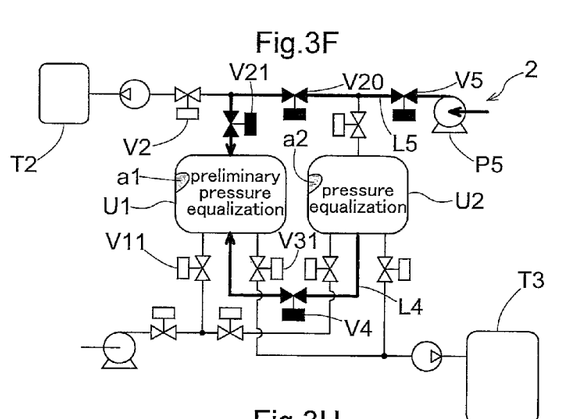
Figure 3G:
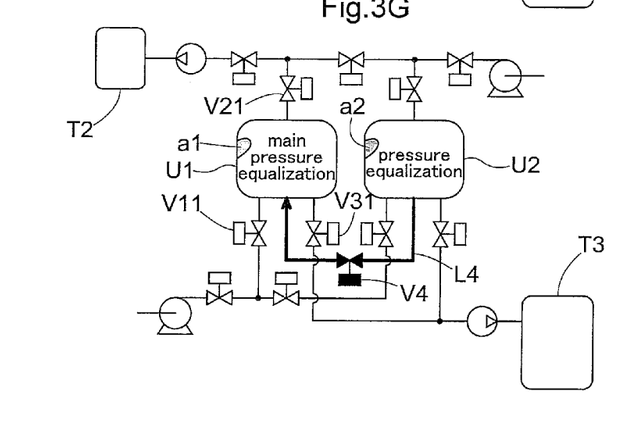
Figure 3H:
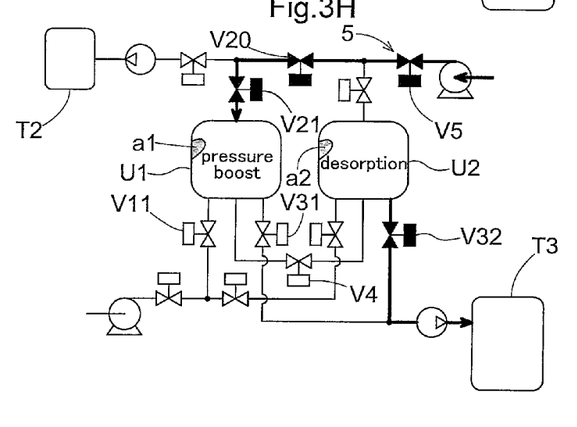

In this desorption step, as shown in FIG. 2(d) and FIG. 3(e), from the adsorbent a1 accommodated in the adsorption tower U1, the adsorbed combustible gas is vacuum-extracted and collected through the gas collection passage L3. In the course of this, the vacuum pump P3 mounted within the product gas collection passage L3 will be activated and only the opening/closing valve V31 in the product gas collection passage L3 will be opened and the other opening/closing valves V11, V21, V4 will be all closed. With these, the desorption step is made possible. With such vacuum extraction operation described above, methane adsorbed to the adsorbent a1 can be collected into the product gas tank T3. This desorption step is effected for 140 seconds.

Incidentally, in the above, inside the second adsorption tower U2, a pressure boost step (FIG. 2(d)) and an adsorption step (FIG. 3(e)) are effected one after another.

<Preliminary Pressure Equalization Step>

The inside of the first adsorption tower U1 which has just undergone a desorption step is under a highly depressurized condition. Hence, it is necessary to return this to a pressure condition suitable for an adsorption step to be effected subsequently. To this end, pressure equalization is effected by establishing communication between the first and second adsorption towers U1, U2 for allowing communication of gases between these adsorption towers U1, U2. With this, the mixture gas inside the second adsorption tower U2 composed of the impurity gas and the combustible gas is caused to flow into the first adsorption tower U1 and re-collection of the combustible gas from the second adsorption tower U2 and pressure boost operation of the first adsorption tower U1 are effected.

However, there exists a significant difference between the inside pressure of the first adsorption tower U1 immediately after completion of the desorption step an the inside pressure of the second adsorption tower U2 immediately after completion of the adsorption step. Hence, if a pressure equalization step were effected directly, this would result in high velocity introduction of the early desorption gas into the first adsorption tower U1. Then, due to the velocity and disturbance of the gas flow, there can occur fluidization of the adsorbent a1, which leads in turn to deterioration and pulverization of the adsorbent. For this reason, prior to the pressure equalization step, a preliminary pressure equalization step is effected at the time of start of the pressure equalization step.

In this preliminary pressure equalization step, as shown in FIG. 3(f), the early desorption gas from the second adsorption tower U2 is received through the pressure equalization passage, and at the same time, an amount of air as a buffer gas will be introduced under the atmospheric pressure through the gas discharge section 2. More particularly, the opening/closing valves V20, V21 of the gas discharge section 2, the opening/closing valve V2 of the off gas discharge passage L2, the opening/closing valve V31 of the product gas collection passage L3 will be closed and the air will be supplied by the buffer gas supply pump P5 through the air supply passage L5; and also the pressure equalization passage opening/closing valve V4 of the pressure equalization passage L4 will be opened to receive the early desorption gas form the second adsorption tower U2. In this way, a pressure equalization is effected.

In the above, with the supply of the early desorption gas through the pressure equalization passage into the first adsorption tower U1 and the supply of the buffer gas from the gas discharge section 2, the pressure difference in the first adsorption tower U1 can be rendered into 15 kPa or less, which otherwise would be 40 kPa in the case of no supply of buffer gas. And, it was visually confirmed that no fluidization had occurred in the adsorbent charged in the first adsorption tower.

Incidentally, in the second adsorption tower U2, a pressure equalization step is effected in parallel with the preliminary pressure equalization step.

<Main Pressure Equalization Step>

Through the preliminary pressure equalization step, the early desorption gas flowing into the first adsorption tower U1 will be rectified. Therefore, even when the introduction of the buffer gas is stopped, the condition for restriction of the fluidization of adsorbent can be maintained. Therefore, the first adsorption tower U1 after completion of the above-described preliminary pressure equalization step will be shifted to the main pressure equalization step.

In this main pressure equalization step, as shown in FIG. 3(g), communication is established between the first adsorption tower and the second adsorption tower U1, U2, thus allowing communication of gas only between these adsorption towers U1, U2, thus effecting pressure equalization therebetween. More particularly, the main pressure equalization step is made possible by opening the pressure equalization passage opening/closing valve V4 of the pressure equalization passage L4 and closing all the other opening/closing valves V11, V21, V31. Also, in the course of the above, a pressure equalization step is effected also in the second adsorption tower U2.

Incidentally, the preliminary pressure equalization step and the main pressure equalization step in the first adsorption tower U1 are effected for about 2 seconds and about 18 seconds respectively, whereas the preliminary pressure equalization step and the main pressure equalization step in the second adsorption tower U2 are both effected for about 20 seconds, respectively.

<Pressure Boost Step>

When a next adsorption step is effected in the first adsorption tower U1 after completion of a desorption step therein, the pressure at which the adsorbent can effectively starts adsorption of the combustible gas is about the atmospheric pressure. However, with the above-described pressure equalization step effected only for the period until the combustible gas concentration in the early desorption gas increases sufficiently, a sufficient pressure increase cannot be expected. Then, separately from pressure boosting in the pressure equalization step, a pressure boost step is effected for boosting the pressure by supplying gas into the first adsorption tower U1.

In this pressure boost step, as shown in FIG. 3(h), an amount of air is pressure-fed from the air supply section 5 into the first adsorption tower U1, so as to boost the inside pressure of the first adsorption tower U1 to a near-atmospheric pressure. More particularly, the inside pressure of the first adsorption tower U1 is effected with opening the opening/closing valves V21, V20, V5 and closing the other opening/closing valves V11, V31, V4. This pressure boost step is effected for 20 seconds.

Figure 4:
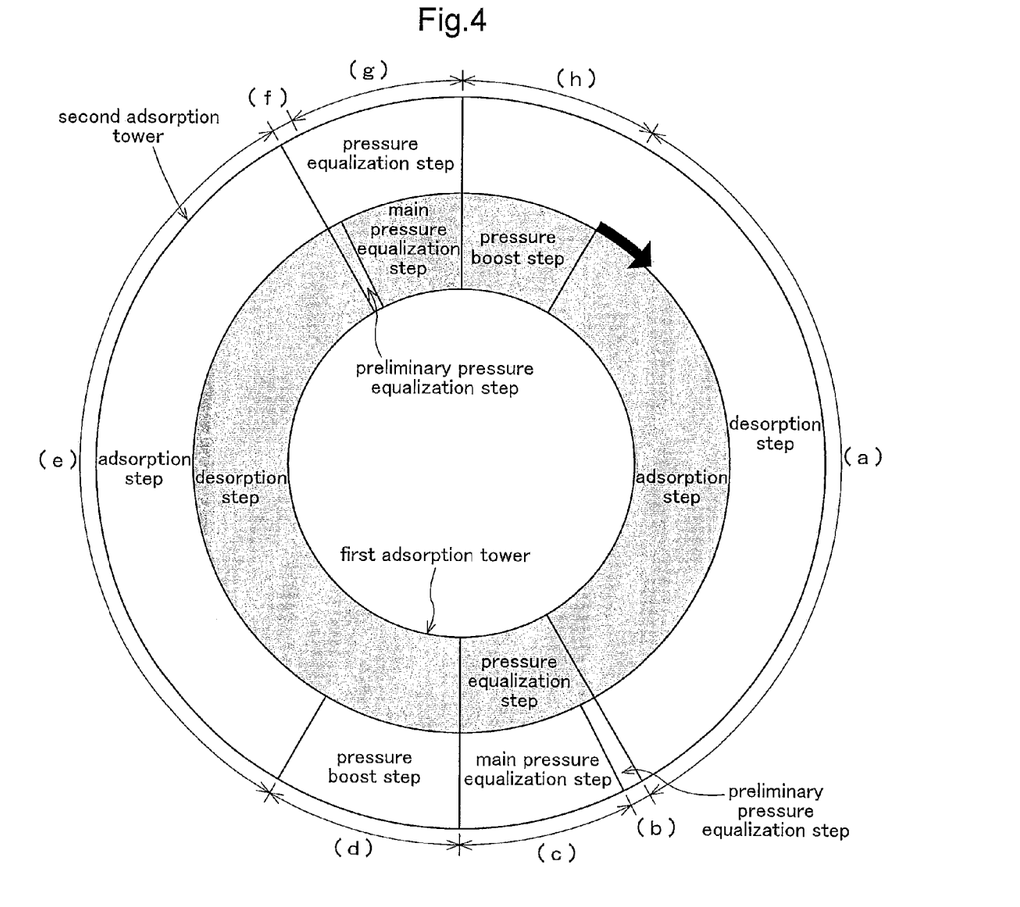
FIG. 4 is a process diagram showing a time cycle of the combustible gas enriching method.

In the first adsorption tower U1 after completion of the pressure boost step, an adsorption step is effected again and the time cycle whose respective steps are shown in FIG. 4 is effected. That is, 320 seconds time cycle is repeatedly carried out which cycle consists of 120 seconds of adsorption step, 20 seconds of pressure equalization step, 140 seconds of desorption step, and 2 seconds of the preliminary pressure equalization step and 18 seconds of the main pressure equalization step combined together as the pressure equalization step and 20 seconds of the pressure boost step.

[Other Embodiments]

In the forgoing embodiment, the time cycles are effected in alternation in two towers. Instead, the time cycles can be effected in a greater number of towers in alternation or one after another. Further, in the foregoing, the pressure boost step is effected as a preliminary step prior to the adsorption step. However, this is not essential for the present invention. The present invention can be applied to any system in which the pressure equalization step is effected in the course of alternated executions of the adsorption step and the desorption step.

Further, if the product gas is employed as the gas to be used in the preliminary pressure equalization step and the pressure boost step, this will contribute to improvement of the product purity advantageously. Whereas, if air is employed, this will contribute to improvement in the product yield. Further alternatively, it is also possible to employ the off gas stored in the off gas tank T2, a semi-product (semi-finished) gas or source gas. Incidentally, in case gas is supplied from the product tank T3 or the off gas tank T2, there is obtained an additional advantage of the gas supply being made possible with effective utilization of the inside pressure of the tank T2 or T3, which in turn will contribute to saving of power consumption of the pump P2.

According to the present invention, it has become possible to provide a combustible gas enrichment system that can be operated with high efficiency with effective restriction of deterioration/pulverization of adsorbent.

DESCRIPTION OF REFERENCE MARKS/NUMERALS

U1: first adsorption tower
U2: second adsorption tower
a1, a2: methane adsorbent
L1: source gas supply passage
L2: off gas discharge passage
L3: product gas collection passage
L4: pressure equalization passage
V4: pressure equalization passage opening/closing valve
L5: air supply passage
T3: product tank
P3: vacuum pump

The invention claimed is:

1. A method of enriching a combustible gas comprising:
providing a gas introduction section to which a source gas is fed, a gas discharge section for discharging an off gas, a gas collection section for collecting a product gas, a plurality of adsorption towers each charged therein with an adsorbent for selectively adsorbing the combustible gas, a pressure equalization passage interconnecting the adsorption towers with each other, and a pressure equalization passage opening/closing valve incorporated within the pressure equalization passage;
feeding the source gas to the adsorption towers from the gas introduction section for causing the combustible gas contained in the source gas to be adsorbed to the adsorbent and causing un-adsorbed gas un-adsorbed to the adsorbent to be discharged from the gas discharge section;
causing the combustible gas adsorbed to the adsorbent to be desorbed from the adsorbent and extracting the desorbed combustible gas to the outside via the gas collection section;
wherein adsorption and desorption are effected in alternation; and
equalizing the pressure between a pair of adsorption towers interconnected via the pressure equalization passage after the adsorption in one adsorption tower and after the desorption in the other adsorption tower, by opening the pressure equalization passage opening/closing valve in the pressure equalization passage;
wherein equalizing the pressure comprises preliminarily equalizing the pressure and mainly equalizing the pressure;
wherein preliminarily equalizing the pressure is effected at the start of equalizing the pressure in an other adsorption tower by supplying a gas into the other adsorption tower from a position different from the connection position of the pressure equalization passage to the other adsorption tower and by opening the pressure equalization passage opening/closing valve in the pressure equalization passage; and wherein mainly equalizing the pressure is effected by keeping only the pressure equalization passage opening/closing valve open after preliminarily equalizing the pressure.

2. The combustible gas enrichment method according to claim 1, wherein the pressure equalization passage is connected to a lower portion of the adsorption tower and the gas discharge section is provided in an upper portion of the adsorption tower, and there is provided a gas supply section for supplying the gas through the gas discharge section into the adsorption tower.

* * * * *